(12) United States Patent
Yeh

(10) Patent No.: US 7,382,504 B2
(45) Date of Patent: Jun. 3, 2008

(54) SHOCK-ABSORBER STRUCTURE FOR SCANNING APPARATUS

(75) Inventor: Chien-Liang Yeh, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 702 days.

(21) Appl. No.: 10/064,252

(22) Filed: Jun. 26, 2002

(65) Prior Publication Data

US 2004/0001235 A1    Jan. 1, 2004

(51) Int. Cl.
*H04N 1/04* (2006.01)

(52) U.S. Cl. .................. 358/497; 358/471; 358/474; 399/379; 248/615; 248/605; 250/239

(58) Field of Classification Search ............... 358/497, 358/474, 471, 400, 500; 399/379, 380, 211, 399/212; 248/615, 605, 634, 635, 560, 562; 250/239, 235, 234; 235/454, 462.14
See application file for complete search history.

(56) References Cited

U.S. PATENT DOCUMENTS

| | | | | |
|---|---|---|---|---|
| 5,521,681 A | * | 5/1996 | Nimura et al. ............ | 399/102 |
| 5,652,665 A | * | 7/1997 | Chen et al. ............... | 358/487 |
| 5,969,245 A | * | 10/1999 | Chiang .................... | 73/431 |
| 6,124,951 A | * | 9/2000 | Chiang et al. ............ | 358/474 |
| 6,131,875 A | * | 10/2000 | Fan ......................... | 248/635 |
| 6,481,626 B1 | * | 11/2002 | Nahar .................. | 235/462.14 |
| 6,687,024 B1 | * | 2/2004 | Short et al. .............. | 358/474 |
| 6,829,065 B1 | * | 12/2004 | Lee et al. ................. | 358/474 |
| 6,906,313 B2 | * | 6/2005 | Hayashi ................... | 250/235 |
| 6,940,623 B2 | * | 9/2005 | Lee et al. ................. | 358/474 |

* cited by examiner

*Primary Examiner*—Cheukfan Lee
(74) *Attorney, Agent, or Firm*—Stolowitz Ford Cowger LLP

(57) ABSTRACT

A shock-absorber structure is mounted in a scanning apparatus including a housing comprised of an upper case and a lower case, and a window transparent board clamped into the lower case. The shock-absorber structure is placed within a slot of the lower case where is clamped a side portion of the window transparent board, and comprises a plurality of resilient elements. The resilient elements are oppositely placed in abutment manner between an inner surface of the slot and the side portion of the window transparent board. The resilient elements respectively have different length so that a multi-stage shock absorption is achieved when the window transparent board successively presses on the resilient elements of different lengths. Collision damages are of the window transparent board thereby prevented.

35 Claims, 3 Drawing Sheets

SHOCK-ABSORBER STRUCTURE FOR SCANNING APPARATUS

BACKGROUND OF INVENTION

1. Field of the Invention

The invention relates generally to a shock-absorber structure for scanning apparatus and, more particularly, to a shock-absorber structure that prevents shock damages of the window transparent board of the scanning apparatus.

2. Description of the Related Art

A flat-platform type scanning apparatus usually includes a scanning module that is movably mounted below a transparent window of the scanning apparatus. The scanning module slides and scans a document placed against the transparent window glass via the driving of a motor connected to a transmission assembly of gears and transmission belts.

The transparent window of the scanning apparatus is conventionally comprised of a transparent glass board that is directly adhered to an upper case of the housing of the scanning apparatus. The upper case in turn is mounted to a lower case to form the complete housing. With the above assembly of the transparent glass board, the adhesion strength must be particularly considered in order to prevent a damageable detachment of the transparent glass board.

Another assembly method known in the prior art is to clamp the transparent glass board via insertion into a slot of the lower case. The transparent glass board thereby serves as a principal support of the structure while the upper case serves as an auxiliary reinforcement member. An advantage of this type of assembly is its readiness. Moreover, the transparent glass board is not easily detached and consequently damaged. However, a disadvantage is that when the scanning apparatus is subjected to a shock, the transparent glass board may collide with an inner sidewall of the slot, causing the corresponding side portion of the transparent glass board to be damaged.

SUMMARY OF INVENTION

An aspect of the invention is therefore to provide a shock-absorber structure that can prevent damageable collisions of a window transparent board of a scanning apparatus.

To accomplish the above and other objectives, the invention provides a shock-absorber structure that is mounted in a scanning apparatus including a housing comprised of an upper case and a lower case, and a window transparent board clamped into the lower case. The shock-absorber structure is placed within a slot of the lower case where is clamped a side portion of the window transparent board, and comprises a plurality of resilient elements. The resilient elements are oppositely placed between an inner surface of the slot and the side portion of the window transparent board. The resilient elements have end portions thereof that extend in a manner that at least one of the resilient elements approximately abuts against the side portion of the window transparent board. The resilient elements respectively have different length so that a multi-stage shock absorption is achieved when the window transparent board successively presses on the resilient elements of different length.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
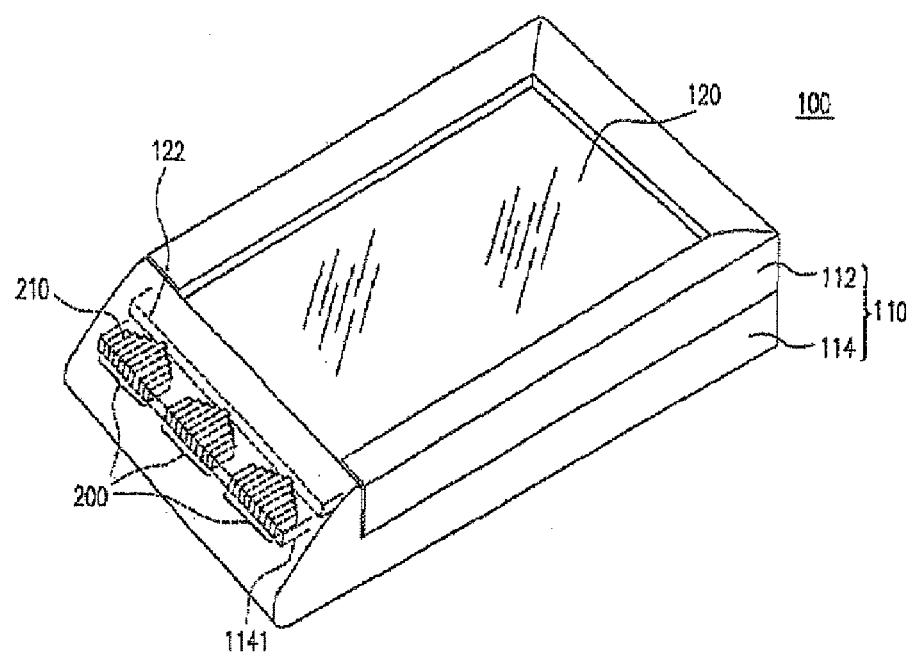
FIG. 1 is a perspective view of a shock-absorber structure mounted within a scanning apparatus according to an embodiment of the invention.

The following detailed description of the embodiments and examples of the present invention with reference to the accompanying drawings is only illustrative and not limiting. Wherever possible in the following description and accompanying drawings, like reference numerals and symbols will refer to like elements and parts unless otherwise described.

Figure 2:
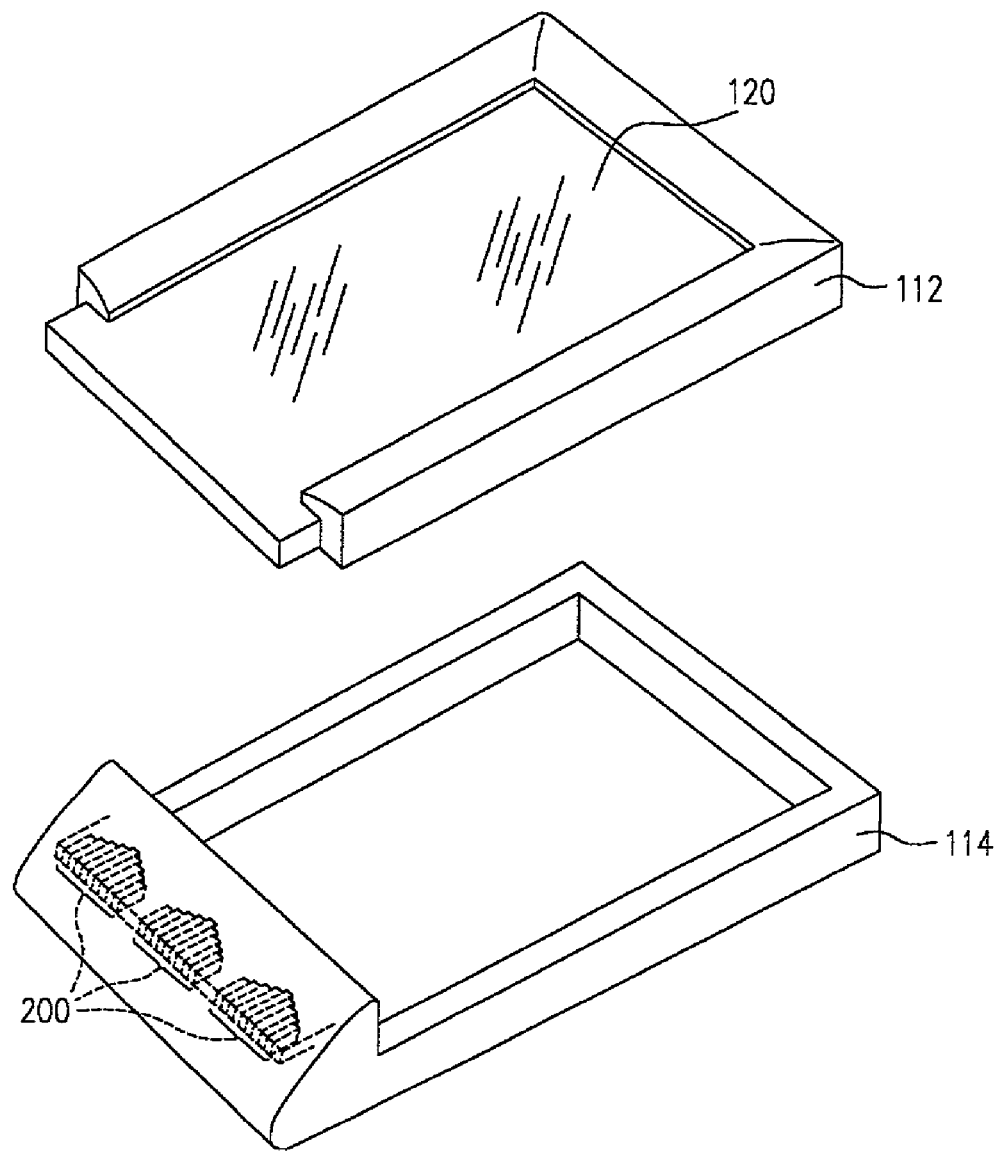
FIG. 2 is an exploded view of the housing of the scanning apparatus provided with a shock-absorber structure according to an embodiment of the invention.

Referring to FIG. 1 and FIG. 2, a perspective view and an exploded view schematically illustrate a shock-absorber structure OF scanning apparatus according to an embodiment of the invention. As illustrated, an optical scanning apparatus 100 has a housing 110 that is comprised of an upper case 112 and a lower case 114. A window transparent board 120 is further mounted to the lower case 114 via clamping. The clamping of the board 120 to the lower case 114 is typically achieved via inserting a side portion 122 of the board 120 in a slot 1141 of the lower case 114.

The upper case 112 then is fixedly attached to the lower case 114, the board 120 is thereby fixedly fastened between the upper case 112 and the lower case 114. The board 120 therefore plays the role of a principal support member while the upper case 112 serves as a secondary reinforcement member.

To prevent the side portion 122 of the board 120 from shock damages due to collision against a sidewall of the slot 1141, a plurality of shock-absorber structures 200 are mounted within the slot 1141. In this embodiment, the shock-absorber structures 200 are in the number of, but not limited to, 3 elements, made of flexible material such as rubber. The shock-absorber structures 200 are oppositely mounted between the board 120 and an inner surface within the slot 1141, and via their flexibility characteristic, absorb shocks exerted on the board 120.

Figure 3:
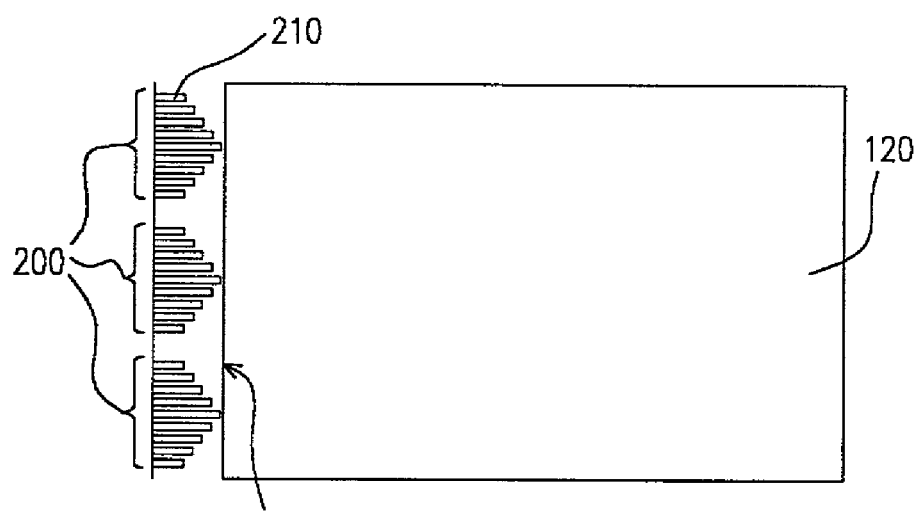
FIG. 3 is a schematic planar view illustrating the disposition of a window transparent board with respect to a shock-absorber structure according to an embodiment of the invention.

Referring to FIG. 3, a planar view schematically shows the respective disposition of the board 120 and the shock-absorber structures 200. Each shock-absorber structures 200 is comprised of a plurality of bar-shaped resilient elements 210 that generally extend toward the side portion 122 of the board 120 in a manner that at least one of the resilient elements 210 abuts against the side portion 122 of the board 120. The bar-shaped resilient elements 210 extend with different lengths.

Figure 4:
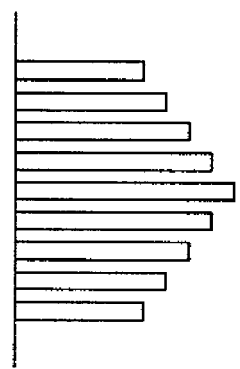
FIG. 4 through FIG. 7 are schematic planar views illustrating various configurations of the shock-absorber structure according to an embodiment of the invention.

FIG. 4 is a planar view that illustrates a regular variation of the length of the bar-shaped elements 210 where the central element has the longest length, at two sides of which the other elements 210 symmetrically have progressively decreasing lengths.

Hence, when the scanning apparatus is subject to a shock that makes the board 120 move further in the slot 1141, the side portion 122 of the board 120 first abuts and presses the resilient element 210 of longest length. Subsequently, as the side portion 122 of the board 120 continues pressing on the shock-absorber structures 200, the other resilient elements 210 of shorter length are successively compressed. Shocks hence are progressively absorbed according to a multi-stage manner.

Figure 5:
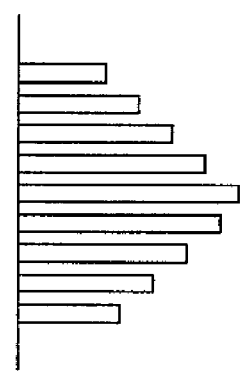
Figure 6:
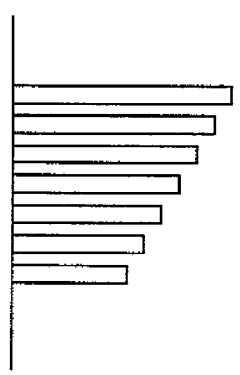

To accomplish an effective multi-stage shock absorption as described above, it would be understood that other general shapes of the shock-absorber structures 200 may be envisaged. FIG. 5 illustrates a variant example where the progressive length decrease at the two sides of the central resilient element of greatest length is according to an alternating manner. FIG. 6 illustrates another variant example where a stepped disposition of the resilient elements 210 is achieved with a continuously monotonous increase of their respective length. It would be therefore readily appreciated that the shock-absorber structures 200 may be achieved with different general shapes according to the disposition of the resilient elements 210 having different length.

Figure 7:
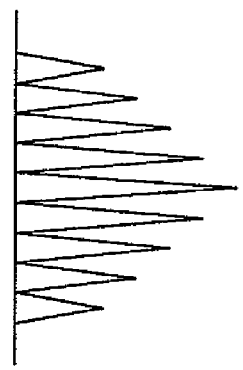

Furthermore, the shape of the resilient elements 210 is not necessarily limited to the above bar-shaped example. As illustrated in FIG. 7, other adequate geometry of the resilient elements 210 may also include, for example, triangular shapes.

As described above, the invention therefore provides a shock-absorber structure that, adequately installed within a housing of a scanning apparatus, effectively prevents collision damages due to shock on the window transparent board of the scanning apparatus. Each shock-absorber structure is comprised of a plurality of resilient elements that, provided with an adequate flexibility and extending toward a side portion of the transparent board with different lengths, enable to achieve a multi-stages shock absorption for protecting the transparent board from collision damages.

It should be apparent to those skilled in the art that other structures that are obtained from various modifications and variations of various parts of the above-described structures of the invention would be possible without departing from the scope and spirit of the invention as illustrated herein. Therefore, the above description of embodiments and examples only illustrates specific ways of making and performing the invention that, consequently, should cover variations and modifications thereof, provided they fall within the inventive concepts as defined in the following claims.

The invention claimed is:

1. An apparatus, comprising:
a shock-absorber structure, adapted to be mounted on a scanning apparatus that includes a housing comprised of an upper case and a lower case, and a window transparent board coupled to the lower case, the shock-absorber structure comprising:
a plurality of resilient elements, adapted to be mounted within a slot of the lower case of said scanning apparatus in abutment with an inner surface of the slot and a side portion of the window transparent board.

2. The appratus of claim 1, wherein the resilient elements comprise flexible material.

3. The apparatus of claim 2, wherein the flexible material comprises rubber.

4. The apparatus of claim 1, wherein at least a portion of the plurality of resilient elements are disposed parallel with respect to one another such that one of the plurality of resilient elements comprises a length greater than the other resilient elements.

5. The apparatus of claim 4, wherein at least a portion of the plurality of resilient elements are grouped proximate to one another such that respective lengths of the resilient elements decreases from the center of the group to the outermost portions of the group.

6. The apparatus of claim 4, wherein at least a portion of the resilient elements are disposed to form a symmetrical group of resilient elements.

7. The apparatus of claim 1, wherein the resilient elements are disposed to form a stepped distribution of resilient elements.

8. The apparatus of claim 1, wherein the resilient elements are approximately bar-shaped.

9. The apparatus of claim 1, wherein the resilient elements are approximately triangular.

10. An apparatus, comprising:
a scanning device, having an upper case and a lower case;
a transparent window disposed on the lower case; and
a plurality of resilient elements disposed on the lower case such that at least a portion of the plurality of resilient elements are adjacent to at least a portion of the transparent window, wherein the resilient elements are disposed to form a stepped distribution of resilient elements.

11. The apparatus of claim 10, wherein the transparent window is generally rectangular shaped, and comprises a top surface, a bottom surface and four edges, wherein the plurality of resilient elements abut at least one edge.

12. The apparatus of claim 10, wherein at least a portion of the plurality of resilient elements comprise flexible material.

13. The apparatus of claim 12, wherein the flexible material comprises rubber.

14. The apparatus of claim 10, wherein the resilient elements are arranged to form a plurality of groups of resilient elements.

15. The apparatus of claim 10, wherein the resilient elements are disposed parallel with respect to one another such that at least one of the plurality of resilient elements comprises a length greater than the other resilient elements.

16. The apparatus of claim 10, wherein at least a portion of the plurality of resilient elements are grouped proximate to one another such that respective lengths of the resilient elements decreases from the center of the group to the outermost portions of the group.

17. The apparatus of claim 10, wherein at least a portion of the resilient elements are disposed to form a symmetrical group of resilient elements.

18. The apparatus of claim 10, wherein the resilient elements are generally bar-shaped.

19. The apparatus of claim 10, wherein the plurality of resilient elements comprise a shock-absorber for the transparent window.

20. The apparatus of claim 10, wherein the portion of the plurality of resilient elements being adjacent to at least a portion of the transparent window includes the portion of the plurality of resilient elements abutting at least a portion of the transparent window.

21. A method, comprising:
disposing a transparent window on a scanning device case; and
disposing a plurality of resilient elements on the case, such that at least a portion of the plurality of resilient elements are adjacent to at least a portion of the transparent window, wherein the resilient elements are disposed parallel with respect to one another such that one of the plurality of resilient elements comprises a length greater than the other resilient elements.

22. The method of claim 21, wherein the transparent window is generally rectangular shaped, and comprises a top surface, a bottom surface and four edges, wherein the transparent window is disposed such that the plurality of resilient elements abut at least one edge.

23. The method of claim 21, wherein at least a portion of the plurality of resilient elements comprise flexible material.

24. The method of claim 23, wherein the flexible material comprises wbber.

25. The method of claim 21, wherein the plurality of resilient elements are disposed to form a shock-absorber for the transparent window.

26. The method of claim 21, wherein the portion of the plurality of resilient elements being adjacent to at least a portion of the transparent window includes the portion of the plurality of resilient elements abutting at least a portion of the transparent window.

27. An apparatus, comprising:
a scanning device, having an upper case and a lower case;
a transparent window disposed on the lower case; and
a plurality of generally bar-shaped resilient elements disposed on the lower case such that at least a portion of the plurality of resilient elements are adjacent to at least a portion of the transparent window.

28. The apparatus of claim 27, wherein at least a portion of the plurality of resilient elements comprise flexible material.

29. The apparatus of claim 27, wherein the flexible material comprises rubber.

30. The apparatus of claim 27, wherein the resilient elements are arranged to form a plurality of groups of resilient elements.

31. The apparatus of claim 27, wherein the resilient elements are disposed to form a stepped distribution of resilient elements.

32. The apparatus of claim 27, wherein the portion of the plurality of resilient elements being adjacent to at least a portion of the transparent window includes the portion of the plurality of resilient elements abutting at least a portion of the transparent window.

33. A scanning device, comprising:
a housing comprised of an upper case and a lower case, the lower case having a slot;
a window transparent board coupled to the lower case; and
resilient means for protecting the window transparent board from shock, the resilient means mounted in the slot of the lower case to be adjacent to an inner surface of the slot and a side portion of the window transparent board.

34. The scanning device of claim 33, wherein the upper case is configured to fixedly attach to the lower case and prevent the window transparent board from movement in a vertical direction.

35. The scanning device of claim 33, wherein the resilient means is mounted in the slot of the lower case to abut the inner surtbce of the slot and the side portion of the window transparent board.

\* \* \* \* \*

UNITED STATES PATENT AND TRADEMARK OFFICE
CERTIFICATE OF CORRECTION

| | | |
|---|---|---|
| PATENT NO. | : 7,382,504 B2 | Page 1 of 1 |
| APPLICATION NO. | : 10/064252 | |
| DATED | : June 3, 2008 | |
| INVENTOR(S) | : Chien-Liang Yeh | |

It is certified that error appears in the above-identified patent and that said Letters Patent is hereby corrected as shown below:

At column 3, line 62, please delete "appratus" and insert -- apparatus --.

At column 4, line 64, after "case" insert -- to form a plurality of groups of resilient elements --.

At column 4, line 65, after "plurality of" insert -- groups of --.

At column 5, line 12, please delete "wbber" and insert -- rubber --.

At column 6, line 28, please delete "surtbce" and insert -- surface --.

Signed and Sealed this

Second Day of November, 2010

David J. Kappos
*Director of the United States Patent and Trademark Office*